United States Patent
Samuel Raj

(10) Patent No.: US 9,787,691 B2
(45) Date of Patent: Oct. 10, 2017

(54) CLASSIFICATION OF UNAUTHENTICATED IP USERS IN A LAYER-2 BROADBAND AGGREGATION NETWORK AND OPTIMIZATION OF SESSION MANAGEMENT IN A BROADBAND NETWORK GATEWAY

(71) Applicant: Cisco Technology, Inc., San Jose, CA (US)

(72) Inventor: Kirubaharan D. Samuel Raj, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 273 days.

(21) Appl. No.: 14/309,975

(22) Filed: Jun. 20, 2014

(65) Prior Publication Data

US 2015/0373688 A1    Dec. 24, 2015

(51) Int. Cl.
*H04L 29/06* (2006.01)
*H04L 12/46* (2006.01)

(52) U.S. Cl.
CPC ........ *H04L 63/108* (2013.01); *H04L 12/4641* (2013.01)

(58) Field of Classification Search
None
See application file for complete search history.

(56) References Cited

U.S. PATENT DOCUMENTS

| | | | |
|---|---|---|---|
| 6,792,474 B1* | 9/2004 | Hopprich | H04L 29/12283 370/392 |
| 7,194,004 B1* | 3/2007 | Thomsen | H04L 63/101 370/401 |
| 7,796,617 B1* | 9/2010 | Bostrom | H04L 12/4633 370/401 |
| 2002/0023018 A1* | 2/2002 | Kleinbaum | G06Q 30/02 705/26.4 |
| 2008/0133719 A1* | 6/2008 | Amitai | H04L 63/0209 709/221 |
| 2008/0244703 A1* | 10/2008 | Takahashi | H04L 63/1416 726/3 |

(Continued)

OTHER PUBLICATIONS

Cisco Systems, Inc. "Intelligent Services Gateway Configuration Guide, Cisco IOS XE Release 3S (Cisco ASR 1000)", retrieved Sep. 10, 2015, pp. 1-206. <http://www.cisco.com/c/en/us/td/docs/ios-xml/ios/isg/configuration/xe-3s/asr1000/isg-xe-3s-asr1000-book.html>.

(Continued)

*Primary Examiner* — Chirag Shah
*Assistant Examiner* — Joshua Smith
(74) *Attorney, Agent, or Firm* — Patterson + Sheridan, LLP

(57) ABSTRACT

A network device, method, and computer program product to perform an operation, the operation comprising defining, in a routing device, a data channel for unauthenticated devices on a virtual local area network (VLAN), wherein the data channel is associated with a reserved media access control (MAC) address, receiving a first sign of life (FSOL) packet from a device, and upon determining that an authentication process for the device has failed, sending, by the routing device to the device, an unsolicited link layer advertisement with the reserved MAC address as the link layer address for the data channel.

20 Claims, 6 Drawing Sheets

(56) References Cited

U.S. PATENT DOCUMENTS

| | | | | |
|---|---|---|---|---|
| 2010/0271980 A1* | 10/2010 | Kini | ............... | H04L 12/462 |
| | | | | 370/256 |
| 2011/0027762 A1* | 2/2011 | Keim | ............... | G09B 5/00 |
| | | | | 434/157 |
| 2011/0283013 A1* | 11/2011 | Grosser | ............ | H04L 61/103 |
| | | | | 709/232 |
| 2014/0071969 A1* | 3/2014 | Roeland | ............ | H04W 76/026 |
| | | | | 370/338 |

OTHER PUBLICATIONS

Cisco Systems, Inc. "Intelligent Services Gateway Configuration Guide, Cisco IOS XE Release 3S (Cisco ASR 1000)", retrieved Sep. 10, 2015, pp. 207-420. <http://www.cisco.com/c/en/us/td/docs/ios-xml/ios/isg/configuration/xe-3s/asr1000/isg-xe-3s-asr1000-book.html>.

Cisco, "Universal Wi-Fi for Service Providers", retrieved Sep. 10, 2015, 3 pages. <http://www.cisco.com/c/en/us/solutions/collateral/service-provider/service-provider-wi-fi/data_sheet_c78-728369.pdf>.

Juniper Networks, Inc., "Network Configuration Example—Configuring Service Provider Wi-Fi", published Jan. 10, 2014, 54 pages. <http://www.juniper.net/techpubs/en_US/release-independent/nce/information-products/topic-collections/nce/nce0076-offloading-wifi-hotspots/configuring-service-provider-wifi.pdf>.

\* cited by examiner

| Port 301 | Source MAC 302 | Destination MAC 303 | VLAN 304 | UIDB 305 |
|---|---|---|---|---|
| <Port 1> | Source MAC 1 | *.* | <VLAN1> | <Subscriber1 IF> |
| <Port 1> | Source MAC 2 | *.* | <VLAN1> | <Subscriber2 IF> |
| <Port 1> | *.* | <R-MAC> | <VLAN1> | < Unauthenticated IF> |
| <Port 1> | *.* | *.* | <VLAN1> | < Access IF> |

CLASSIFICATION OF UNAUTHENTICATED IP USERS IN A LAYER-2 BROADBAND AGGREGATION NETWORK AND OPTIMIZATION OF SESSION MANAGEMENT IN A BROADBAND NETWORK GATEWAY

TECHNICAL FIELD

Embodiments presented in this disclosure generally relate to computer networks. More specifically, embodiments disclosed herein relate to classification of unauthenticated Internet protocol (IP) users in a layer-2 broadband aggregation network and optimization of session management in a broadband network gateway.

BACKGROUND

The recent proliferation of mobile devices have made mobile broadband network operators attempt to offload data traffic to wireless (IEEE 802.11 Wi-Fi) networks whenever possible. These Wi-Fi networks may therefore include user devices, wireless access points, wireless LAN controllers (WLC), and broadband network gateways (BNG). In such a deployment model, service providers need to manage subscribers using BNG.

In providing public Wi-Fi access points, all mobile devices carried by users near the access points may pick up the signal and attach to the Wi-Fi network, regardless of whether the user is aware of the connection. A user, as used herein, may be an unauthenticated device on the network, while a subscriber may be a user that has been authenticated and identified. When mobile devices connect to the public Wi-Fi, their users may or may not log in to the authentication portal in order to authenticate and use network services. If authenticated, these mobile devices are typically forced to go through subscriber management functions of the BNG, and are managed using dedicated control plane sessions and data plane interfaces allocated to each subscriber in the BNG. Currently, however, in BNG since subscribers are identified with the first packet (FSOL) from devices, no distinction is made between authenticated and unauthenticated users. All users are allocated a new session, including system resources, regardless of whether the users are authenticated. If the users are unauthenticated, they are redirected to an authentication portal. All unclassified data FSOL packets may be sent to the CPU of the BNG to trigger the authentication process.

Stated differently, traditionally, until a data plane classification context (identified by mobile device source MAC address), data packets will be unclassified, and therefore must be processed by the CPU of the BNG. A dedicated data plane context is therefore created even for unauthenticated users, only to carry traffic to the authentication portal (or other free portals). This allocation of system resources to unauthenticated users may unnecessarily waste system resources, and is exacerbated when a high churn of roaming users in a concentrated area connect to the access points without authenticating.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 illustrates a table including session classification information to classify unauthenticated IP users in a layer-2 broadband aggregation network and optimize session management in a broadband network gateway, according to one embodiment.

DESCRIPTION OF EXAMPLE EMBODIMENTS

Overview

Figure 1:
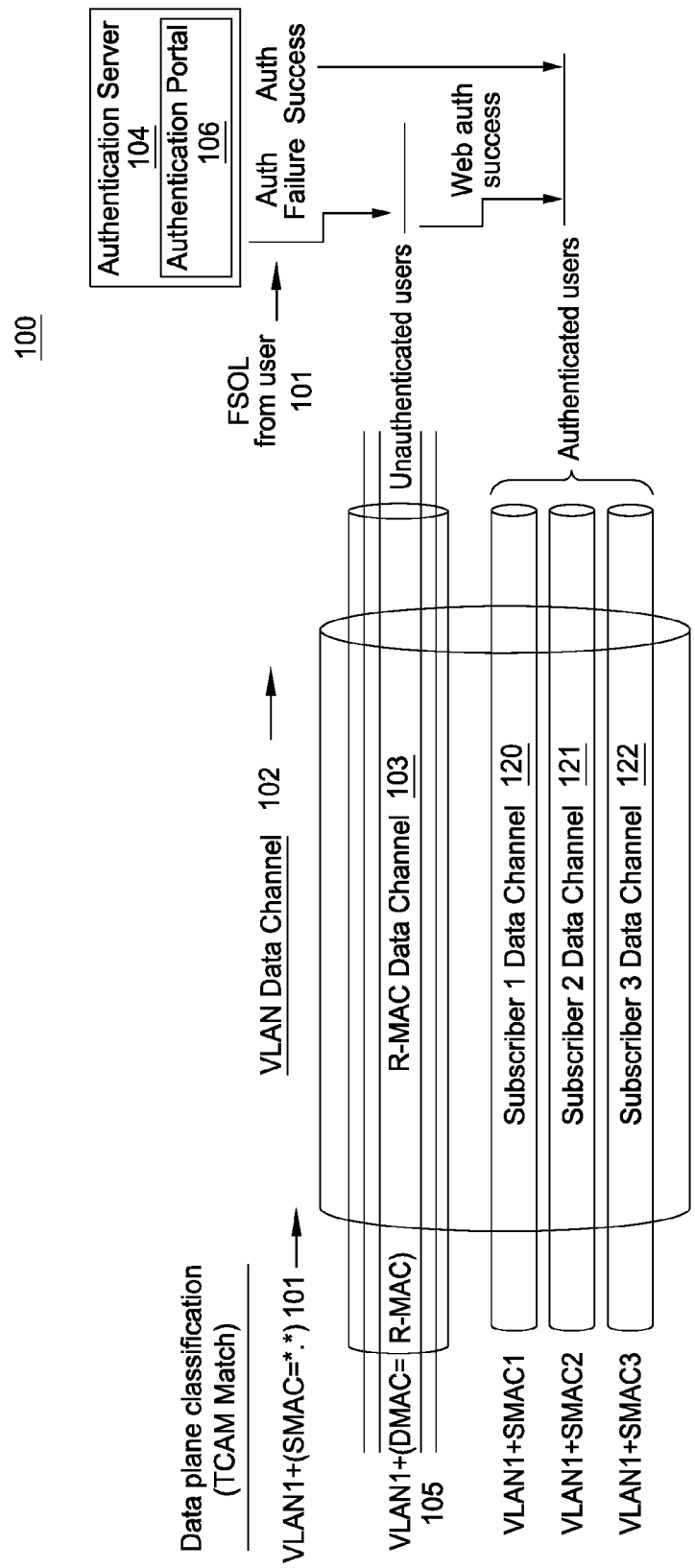
FIG. 1 illustrates a logical view of a system to classify unauthenticated IP users in a layer-2 broadband aggregation network and optimize session management in a broadband network gateway, according to one embodiment.

Embodiments disclosed herein include at least a network device, a method, and a computer program product to perform an operation, the operation comprising defining, in a routing device, a data channel for unauthenticated devices on a virtual local area network (VLAN), wherein the data channel is associated with a reserved media access control (MAC) address, receiving a first sign of life (FSOL) packet from a device, and upon determining that an authentication process for the device has failed, sending, by the routing device to the device, an unsolicited link layer advertisement with the reserved MAC address as the link layer address for the data channel.

Example Embodiments

Embodiments disclosed herein describe techniques to allow a broadband network gateway (BNG) to aggregate a layer-2 access network to uniquely classify unauthenticated users and make them use a common routed channel for accessing an authentication portal or other free portals. Generally, embodiments disclosed herein withhold subscriber management and other resources provided by the BNG to unclassified first sign of life (FSOL) packets that are sent to the CPU of the BNG until the mobile devices are authenticated. In doing so, embodiments disclosed herein may free resources in the BNG in both the data plane (replacing per-user interface representation in network processors/ASICs) and the control plane (per user session). The freed resources may be used to scale up or otherwise improve sessions for authenticated users. The unclassified FSOL packets may be, for example and without limitation, dynamic host configuration protocol (DHCP) packets, address resolution protocol (ARP) packets, any neighbor discovery packets (such as IPv6 router solicitation (RS) or neighbor solicitation (NS)) or other unclassified data packets from user devices.

In a BNG, wireless subscribers may be connected through a layer-2 access network. A virtual local area network (VLAN) may be pre-configured on a port of the BNG, such that a data channel associated with the VLAN may receive the first packets from wireless devices coming from the access network (which may be through a wireless LAN controller (WLC) in a Wi-Fi access network). The packets from the wireless devices may include a VLAN tag including a VLAN ID added by the WLC (which may be mapped to the Wi-Fi SSID of the network operator). The VLAN ID and the source MAC address of the wireless device may be used to uniquely identify the wireless device in the BNG. Traditionally, an entry in a classification table of the BNG may be created responsive each FSOL packet from a wireless device, with the source MAC address and the VLAN ID uniquely identifying the wireless device in the classification table, regardless of whether the wireless device was successfully authenticated. However, if the user/wireless device does not successfully authenticate after sending the FSOL packet, embodiments disclosed herein cause the BNG to send, to the wireless device, an unsolicited link layer MAC address advertisement for link layer address resolution including a reserved MAC (referred to herein as an R-MAC) address used to identify a special channel reserved for unauthenticated users and their devices. For example, and without limitation, the MAC address advertisement may be a gratuitous address resolution protocol (ARP) unicast message or an unsolicited unicast neighbor advertisement (NA).

Once the wireless device receives the advertisement, the wireless device may update its local neighbor table or ARP cache, as the case may be, to reflect the R-MAC as being the next hop MAC address. Further data packets from the wireless device will therefore come to the BNG specifying the R-MAC as the destination MAC address. The BNG may use such data packets (specifying the R-MAC) in order to uniquely classify unauthenticated users on the BNG, and direct the users to a common data channel reserved for all unauthenticated users. The common, reserved data channel may also be referred to herein as an R-MAC data channel. In doing so, embodiments disclosed herein provide a way to move all unclassified data traffic directed to authentication (or free) portals away from the VLAN data channel after the FSOL packet from the wireless device is processed.

The common data channel for unauthenticated users may be pre-created for each VLAN on the BNG. A policy may be applied to each common data channel such that any requests from the wireless device to a public Internet address will be responded to with a redirect from the BNG to an authentication portal. The common data channel may be identified by all packets matching a unique destination MAC address on the VLAN, namely the R-MAC of the VLAN. Generally, any type of policy may be applied to the common data channel of each VLAN. For example, the common data channel may allow access to open-garden and free portals through access control list (ACL) policies.

Additionally, all FSOL packets may create a small context of MAC-IP-Channel binding in software, which may be used for change-of-authorization (CoA) when the user successfully authenticates.

Reference is made herein to a subscriber network in which wireless devices connect to the BNG through a layer-2 network for illustrative purposes. However, the example configurations cited herein should not be considered limiting of the disclosure, as the disclosure is equally applicable to classify flows in all configurations where devices with layer-3 or above networking capabilities are connected by a layer-2 network. Networking layers, such as layer-2 and layer-3, are defined in the Open Systems Interconnection (OSI) model. Generally, the decision to put flows into a shared, common data channel can be based on authentication failure, which is cited herein for illustrative purposes, but can be equally applicable based on other reasons defined by the network owner (or operator).

FIG. 1 illustrates a logical view of a system 100 to classify unauthenticated IP users in a layer-2 broadband aggregation network and optimize session management in a broadband network gateway, according to one embodiment. Generally, the system 100 depicts data packets flowing through a router, which in at least one embodiment, may be a broadband network gateway (BNG). As shown, a plurality of data channels for a single VLAN have been defined in the router, including a VLAN data channel 102, an R-MAC data channel 103, and subscriber data channels 120, 121, and 122. Generally, the BNG may include similar data channels for each of a plurality of VLANs connected to a respective port of the BNG. The R-MAC data channel 103 is a dedicated data channel reserved for unauthenticated users that have sent FSOL packets to the BNG. The R-MAC data channel 103 is defined by packets sent from wireless devices that specify the R-MAC address as the destination address. The BNG includes logic configured to identify data packets (or flows) through data plane classification. For example, the BNG may include a table in a TCAM that allows the BNG to classify packets based on one or more attributes, such as source address, destination address, and VLAN tags. Instead of a TCAM, a network processor, ASIC, or a software table (in case of a virtual router implemented in software) may be implemented to classify the data packets.

Generally, when a wireless device connects to a wireless access point, the BNG may receive a FSOL packet 101 from the wireless device. The FSOL packet may be, for example and without limitation, dynamic host configuration protocol (DHCP) packets, IPv4 address resolution protocol (ARP) broadcast or unicast packets, any neighbor discovery packets (e.g., IPv6 NS or RS multicast or unicast packets), or other unclassified data packets from user devices. The FSOL packet 101 may be received through the VLAN data channel 102, and may be forwarded to a control plane of the BNG (not pictured). Once received by the control plane, the wireless device is directed to an authentication server 104. The authentication server 104 may be an authentication, authorization, and accounting (AAA) server configured to identify those users (and their devices) that have subscribed for access to network resources. The authentication portal 106 is a web server that may be hosted by the authentication server 104. However, the authentication portal 106 may be hosted on any web server.

Initially, the BNG exchanges a RADIUS protocol message (access-request from the BNG) with the authentication server 104. If authentication succeeds (via an access-accept from the authentication server 104), no involvement from the authentication portal 106 is necessary. If the authentication process is successful, the wireless device is authenticated, and a dedicated subscriber data channel, such as the data channels 120-122, is created for the wireless device. Additionally, the BNG may create a session (not pictured) for the authenticated wireless device. However, if authentication with the authentication server 104 fails, traffic from the device is put on a common data channel. More specifically, if the authentication process fails, the unauthenticated wireless devices may be placed in the R-MAC data channel

103. The R-MAC data channel 103 is configured to intercept, in hardware, any http request for internet public domains, and send these requests to software in the BNG. The software in the BNG may then respond with an http redirect address to an internal authentication portal, such as the authentication portal 106. The wireless device then sends a new request to the authentication portal 106, which is loaded on the device, which allows the user to fill a web-based form in order to log in to the network. The data entered by the user may be sent by the authentication portal 106 to the authentication server 104 for authentication.

In order to place the unauthenticated devices on the R-MAC data channel 103, the BNG may send an unsolicited link layer MAC address advertisement specifying the R-MAC to the wireless device, such that the wireless device updates its information to reflect the R-MAC as its next hop. For example, and without limitation, the MAC address advertisement may be a gratuitous address resolution protocol (ARP) unicast message or an unsolicited unicast neighbor advertisement (NA). The wireless device may then update its ARP cache or neighbor table with the R-MAC. As such, any subsequent data packets sent by the wireless device may specify the R-MAC, such that the BNG knows to classify the traffic as belonging to an unauthenticated device, and should be placed on the R-MAC data channel 103.

Therefore, for example, if the wireless device sends a hypertext transfer protocol (HTTP) request 105 for a public web site, the request 105 will specify the R-MAC as its destination MAC address. As such, the BNG will identify the R-MAC as the destination MAC address, and place the HTTP request 105 on the R-MAC data channel 103. A data plane policy for the R-MAC data channel 103 may specify a plurality of access rules for accessing different addresses. For example, the policy may specify that requests, such as the HTTP request 105, specifying public web addresses as a destination, should be intercepted and redirected to the authentication portal 106. The policy on the R-MAC data channel 103 may allow the device access to the authentication portal 106 (and possibly other free or open-garden addresses). Therefore, instead of reaching the intended destination (the public web address), the wireless device may reach the authentication portal 106, where a user (or the device) may attempt to authenticate. If the user chooses to authenticate and is successful in doing so, the BNG may create a dedicated session and data channel (such as the data channels 120-122). In addition, if the authentication is successful, the BNG may send an advertisement specifying a regular interface MAC address for the BNG corresponding to the dedicated data channel for the authenticated wireless device. The MAC address advertisement, for example and without limitation, may be a gratuitous ARP unicast message or an unsolicited NA (neighbor advertisement) unicast message.

If, however, the user does not authenticate, or the authentication process otherwise fails, the wireless device remains in the R-MAC data channel 103. The BNG may allow the wireless device to remain in the R-MAC data channel 103 until a predefined period of time elapses. Therefore, as shown in FIG. 1, embodiments disclosed herein maintain a dedicated channel for all unauthenticated users in the BNG, without needing to provide a per-user classification context in the data plane.

Figure 2:
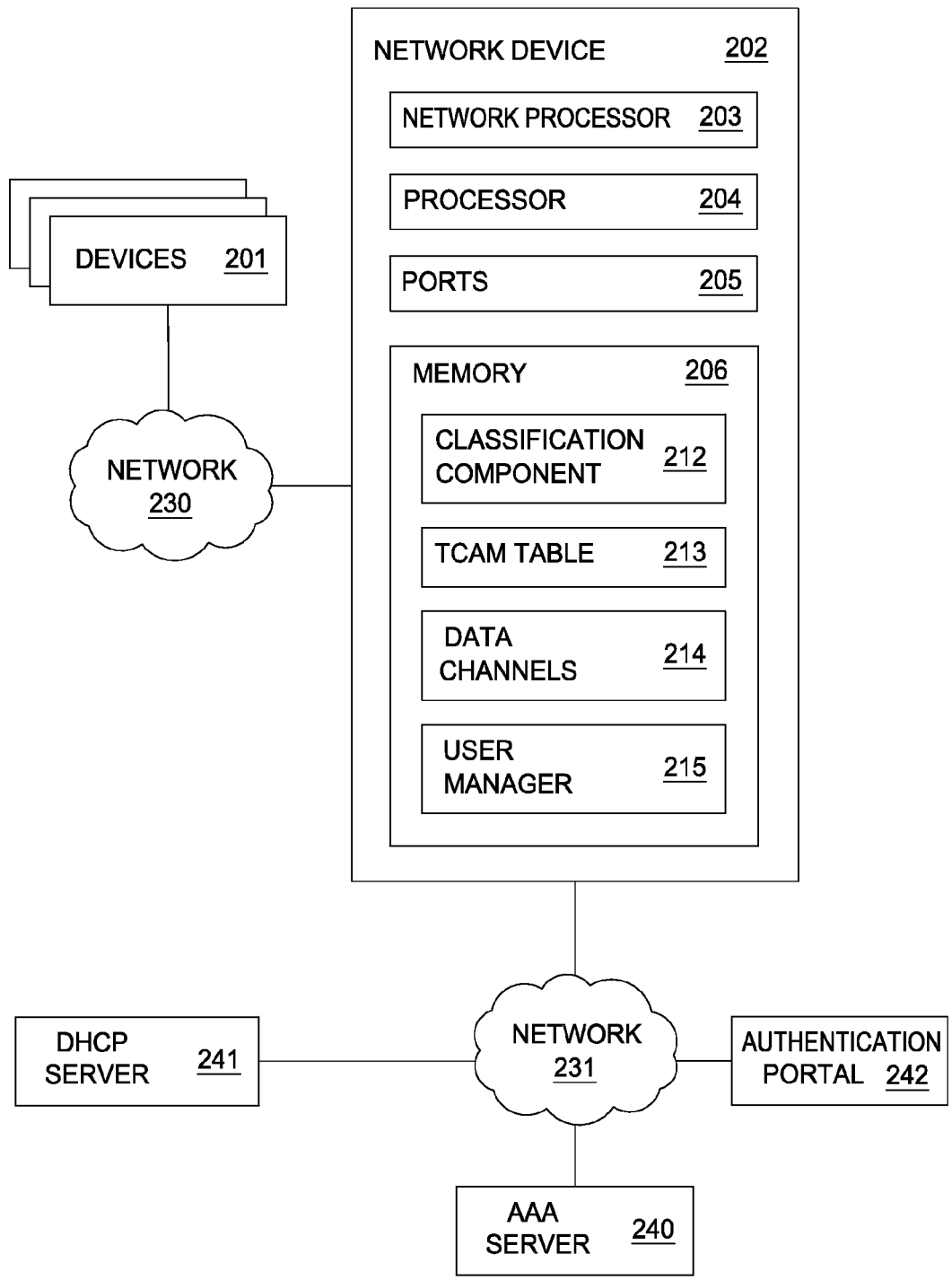
FIG. 2 is a block diagram illustrating a system 200 to classify unauthenticated IP users in a layer-2 broadband aggregation network and optimize session management in a broadband network gateway, according to one embodiment.

FIG. 2 is a block diagram illustrating a system 200 to classify unauthenticated IP users in a layer-2 broadband aggregation network and optimize session management in a broadband network gateway, according to one embodiment. As shown, a plurality of devices 201 are connected to a network device 202 through a network 230. In at least some embodiments, the devices 201 connect to the network 230 using a wireless connection. Generally, the devices 201 may be any computing device implementing layer-3 or above networking communications, such as a laptop, tablet, or a smart phone implementing IPv4 or IPv6. The network 320 may generally be a layer-2 network. The network device 202 may be any networking device implementing layer-3 or higher networking communications, such as a router or a switch. In at least one embodiment, the devices 201 are wireless devices connecting to the network 230 via a public Wi-Fi access point, and the network device 202 is a broadband network gateway (BNG). The network device 202 may be the first layer-3 device data from the devices 201 reach when traversing the layer-2 network 230.

The network device 202 includes a processor 202, a network processor 203, a set of communications ports 205, and a memory 206. The processor 202 may be any processing element capable of performing the functions described herein. The processor 202 may represent a single processor, multiple processors, a processor with multiple cores, and combinations thereof. The network processor 203 may be a specialized network processor, an ASIC, or a multicore processor that can perform packet processing functions in hardware, microcode, or software at wire speed. The network processor 203 may access specialized memory, such as a TCAM, hardware tables, or other memory, in order to process data packets. In some embodiments, therefore, the processor 204 executes software as part of the control and management plane in the network device 202, while the processor 203 processes data packets. The memory 206 may be, e.g., volatile or non-volatile memory, and may represent RAM, flash, cache, disk drives and the like. Although shown as a single entity, the memory 206 may be divided into different memory storage elements such as RAM and one or more hard disk drives. Each port in the set of ports 205 in the network device 202 may be associated with a specific wireless access point providing access to the devices 201. In at least some embodiments, an operator or network administrator may configure a VLAN corresponding to the SSID of Wi-Fi network on the ports 205 or port bundle of the network device 202 connecting to the WLC.

As shown, the memory 206 includes a classification component 212, TCAM table 213, data channels 214, and a user manager 215. The classification component 212 is generally configured to classify data flows received through the ports 205. A flow in a computer data network is generally a sequence of data packets matching specific classification criteria. The classification component 212 is therefore configured to identify flows matching a certain set of criteria, which may be matched on one or more of the fields of each data packet itself, such as a source MAC address or a destination MAC address. In order to match the data packets against the criteria, the classification component 212 may reference special search memory, such as the TCAM table 213. The TCAM table 213 may store the information for a plurality of data channels 214, including the R-MAC data channel 103. In some embodiments, the TCAM table 213 may be replaced by a hardware table, or a similar data structure. In at least one embodiment, the TCAM table 213 is part of the classification component 212. In at least one embodiment, the TCAM table 213 and the classification component 212 are part of the network processor 203. The classification component 212 is responsible for identifying flows by examining the packets arriving at an input port 205, matching one or more of the fields of the packets or examining multiple packets to build states, and directing the packets to undergo processing in the network element 202. For example, the network element 202 may make a routing/forwarding decision for the packets, apply traffic management functions, or make priority queuing decisions for the packets.

The classification component 212 is further configured to make a group of flows, which meet certain predefined criteria and need to be subject to similar processing in the network element 202, optimally classified without having a dedicated classification entry in the TCAM table 213. In at least one embodiment, this group of flows is all data flows in the network element 202 that are sent by user devices that have not authenticated with the AAA server 240. The AAA server 240 is an authentication, authorization, and accounting server used to authenticate subscribers who are authorized to use network resources. Generally, when a FSOL packet is received from one of the devices 201, the classification component 212 in the network processor 203 sends the packet to the processor 204, and as decided by the policy plane software in the processor 204, an access request specifying identification information for the device 201 is sent to the AAA server 240 for authentication. If the device 201 is authenticated, a dedicated data channel 214 for carrying control plane and data plane traffic may be created for the authenticated device 201. The FSOL packet may be, without limitation, an ARP broadcast or unicast request, DHCP packet destined for the DHCP server 241, an NS or RS multicast or unicast, or any other data coming from unclassified source MAC address.

Generally, one or more data channels 214 are provided in the network device 202 to carry data traffic. A data channels is a logical classification of a flow, with an index assigned as a result of a classification decision, such that further stages of the network device 202 can use the index to process the flow uniquely. One or more of the data channels 214 may be configured to receive FSOL packets, such as the VLAN data channel 102. One or more of the data channels 214 may be dedicated for authenticated subscribers, such as the data channels 120-122. Additionally, one or more of the data channels 214 may be reserved for all unauthenticated devices 201, such as the R-MAC data channel 103. This reserved data channel may be identified by a special destination MAC address, referred to herein as the R-MAC address. An R-MAC data channel 214 may be created for each VLAN in the network device 202.

If the authentication process fails, and the device 201 is not authenticated, the network device 202 may send an unsolicited link layer MAC address advertisement including the R-MAC address to the unauthenticated device 201. In at least some embodiments, the advertisement may comprise a gratuitous address resolution protocol (ARP) unicast message (in an IPv4 configuration), or an unsolicited unicast neighbor advertisement (NA) (in an IPv6 configuration). This advertisement may cause the unauthenticated device 201 to update its neighbor table or ARP cache with the R-MAC as the next hop MAC address, as the case may be. Doing so causes the unauthenticated device 201 to send subsequent data packets having the R-MAC as the destination MAC address. The classification component 212, when observing packets specifying the R-MAC as the destination MAC address, may therefore identify data packets from the unauthenticated devices, and allocate them to the R-MAC data channel 214 for that VLAN. Special policies may be applied to the R-MAC data channel 214. For example, the policy for R-MAC data channel 214 may route requests to free content to the requested destination. However, the policy may further specify that requests to public content that requires subscriber access should be redirected to the authentication portal 242. The authentication portal 242 is an application executing on a web server that allows users to enter credentials for authentication, which may be referenced against the AAA server 240. In at least some embodiments, the network device 202 may impose an access time limit for the R-MAC data channel 214 for each device 201. For example, if the time limit is one minute, the device 201 may be removed from the R-MAC data channel 214 one minute after the device connects, in order to save resources in the network device 202.

As shown, the network device 202 communicates with the AAA server 240, DHCP server 241, and AAA portal 242 through the network 231. The network 231 may be any type of network. In at least one embodiment, the network 231 is a core network owned by a service provider that provides the public Wi-Fi access to the devices 201. The network 231 may also be connected to the Internet. The AAA server 240 is authentication, authorization, and accounting server used to authenticate subscribers who are authorized to use network resources. For example, the AAA server 240 may store login credentials that must be entered by a user to gain access to network resources. Similarly, the AAA server 240 may store a list of source MAC addresses (or other identification information) for the devices 201 of paying subscribers. If the AAA server 240 receives a RADIUS protocol packet with an access-request containing credentials matching the stored identification information, the AAA server 240 may authenticate the device. The DHCP server 241 may be a server configured to dynamically distribute network configuration parameters, such as IP addresses for interfaces and services.

FIG. 3 illustrates a table 213 including session classification information to classify unauthenticated IP users in a layer-2 broadband aggregation network and optimize session management in a broadband network gateway, according to one embodiment. In at least one embodiment, the table 213 is the TCAM table 213, which used to classify data packets (or flows) in the network device 202 into one or more channels. Although depicted as a TCAM, the TCAM table 213 may be a hardware data table, or a software data table. Each row in the table 213 may therefore correspond to a different data channel. Although the TCAM table 213 reflects entries for a single port, a plurality of entries corresponding to each port 205 on the network device 202 may be defined in the TCAM table 213. For example, an R-MAC for each port of the network device 202 may be defined, with each having its own unique R-MAC address.

As shown, the TCAM table 213 specifies a port (or bundle) 301, a source MAC address 302, a destination MAC address 303, a VLAN 304, and a micro interface descriptor block (UIDB) 305. The port 301 corresponds to a port 205 of the network device 202. The source MAC address 302 corresponds to a source MAC address of the data packet or flow. A destination MAC address 303 corresponds to the destination MAC address of the data packet or flow. A VLAN 304 identifies a VLAN associated with the port. The UIDB 305 specifies a set of properties for each data flow or data channel. For example, an http redirect policy may be linked to the R-MAC data channel. Therefore, as shown, data packets not matching any of the more specific classification entries specifying source or destination MAC addresses 302 and 303 (unclassified) may be sent to the processor 204, or may be are forwarded on the access interface. Authenticated subscribers are identified as <Subscriber 1> and <Subscriber 2>, and may match on the table 213 with a unique source MAC address 302, along with a wildcard destination MAC address 303. The R-MAC data channel, however, specifies a wildcard source MAC address 302 and the R-MAC as the destination MAC 303. Therefore, a data packet or flow coming from any source MAC address 302 that specifies the R-MAC 303 as the destination MAC address 303 is automatically placed on the R-MAC data channel.

Figure 4:
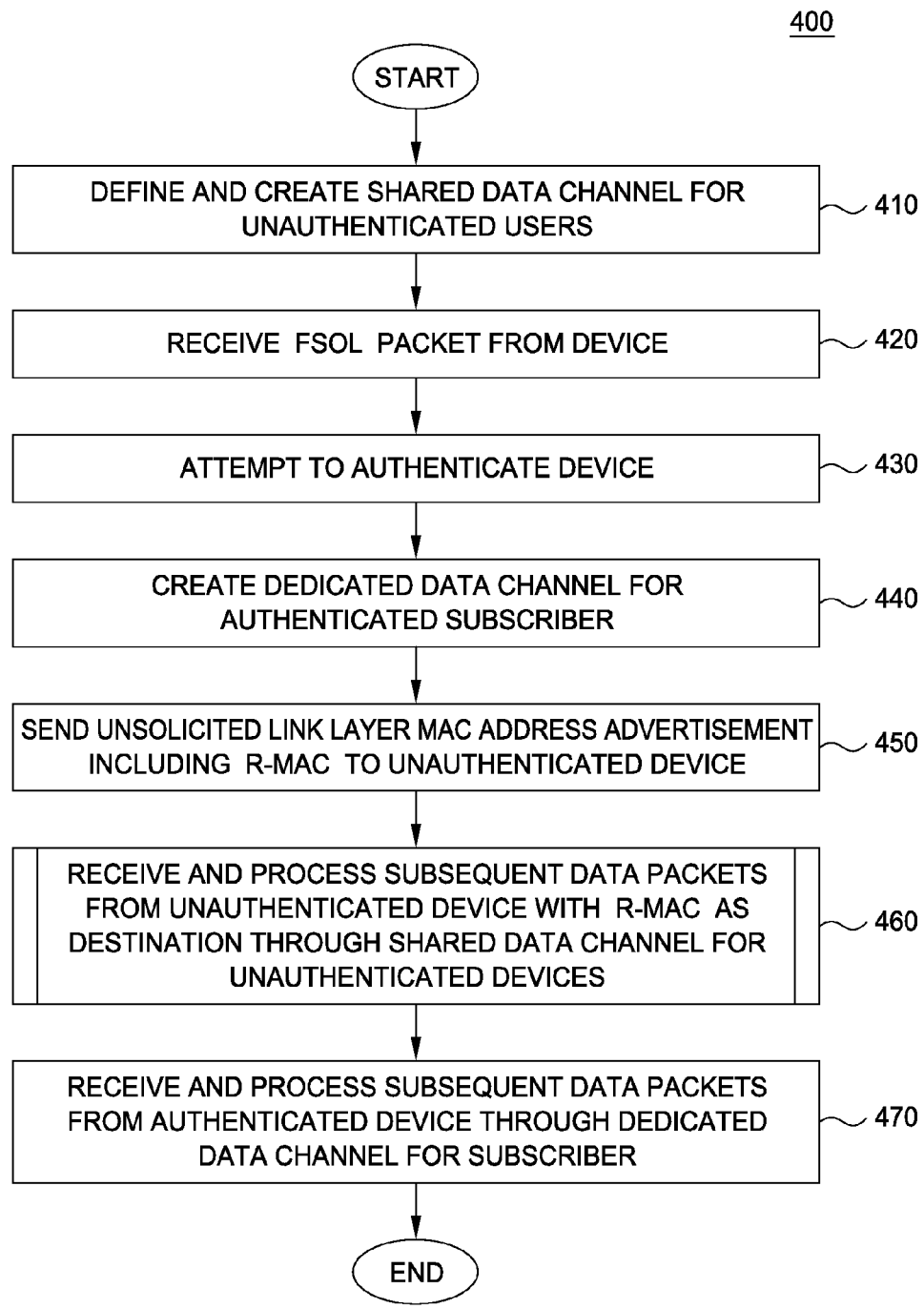
FIG. 4 is a flow chart illustrating a method to classify unauthenticated IP users in a layer-2 broadband aggregation network and optimize session management in a broadband network gateway, according to one embodiment.

FIG. 4 is a flow chart illustrating a method 400 to classify unauthenticated IP users in a layer-2 broadband aggregation network and optimize session management in a broadband network gateway, according to one embodiment. Generally, the network device 202, or a designated component thereof, may implement the method 400 in order to uniquely classify unauthenticated users in a broadband network Gateway (BNG) without per-user classification contexts in the data plane by using a special destination MAC address and a shared classification context in the data plane. Stated differently, the method 400 defines a special data channel shared by unauthenticated users that provides limited access to free portals or an authentication portal.

At block 410, the network device 202 (or a user, such as a network administrator) may define and create a shared data channel for unauthenticated users. The shared data channel may be pre-created for each VLAN in the network device 202. The shared data channel for each VLAN may be identified by an R-MAC, or reserved MAC address. The shared data channel, also referred to as the R-MAC data channel, may be identified by all packets specifying the R-MAC as the destination MAC address for the VLAN. One or more policies may be defined for the R-MAC data channel. For example, all requests to external resources (such as web pages not owned by the network provider) may be redirected to an authentication portal. Optionally, the R-MAC data channel may allow access to open-garden and free portals through ACL policies.

At block 420, the network device 202 may receive a FSOL packet from a wireless device. The FSOL packet may be a DHCP packet, ARP request, any neighbor discovery packets (NS or RS), or a packet from a device having an unclassified source MAC address. In some embodiments, an authentication timer for the user or device may be started. At block 430, the network device 202 may attempt to authenticate the device by sending an access request to the AAA server 240. Generally, the FSOL packet may cause the network device 202 to send a RADIUS protocol message (namely an access request) to the AAA server 240. If the authentication is successful, the network device 202 may create a dedicated data channel for the authenticated subscriber at block 430. Generally, the network device 202 may provide a full subscriber management session with control plane and data plane resources to an authenticated subscriber.

If the device is not authenticated, at block 450, the network device 202 may send an unsolicited link layer MAC address advertisement including the R-MAC as the link layer address of the IP address for the VLAN to the unauthenticated device. Generally, the advertisement is of the link layer address (MAC) corresponding to the IP address of an interface (port/VLAN) of the network device 202. The MAC address advertisement may be, for example and without limitation, a gratuitous ARP (IPv4) or an IPv6 unicast network advertisement (NA). In sending the advertisement, the network device 202 may cause the unauthenticated device to change a neighbor table or ARP cache, as the case may be, to reflect the R-MAC as its next hop destination. Thereafter, any packets sent by the unauthenticated device will include the R-MAC as the destination MAC address, allowing the network device 202 to identify all unauthenticated devices. At block 460, described in greater detail with reference to FIG. 5, the network device may receive and process subsequent data packets from the unauthenticated device specifying the R-MAC as the destination MAC address through the R-MAC data channel for unauthenticated devices. Generally, the network device 202 may apply policies to restrict unauthenticated devices to free content and an authentication portal. At block 470, the network device 202 may receive and process subsequent data packets from authenticated devices through the dedicated data channel created for the subscriber at block 440.

Figure 5:
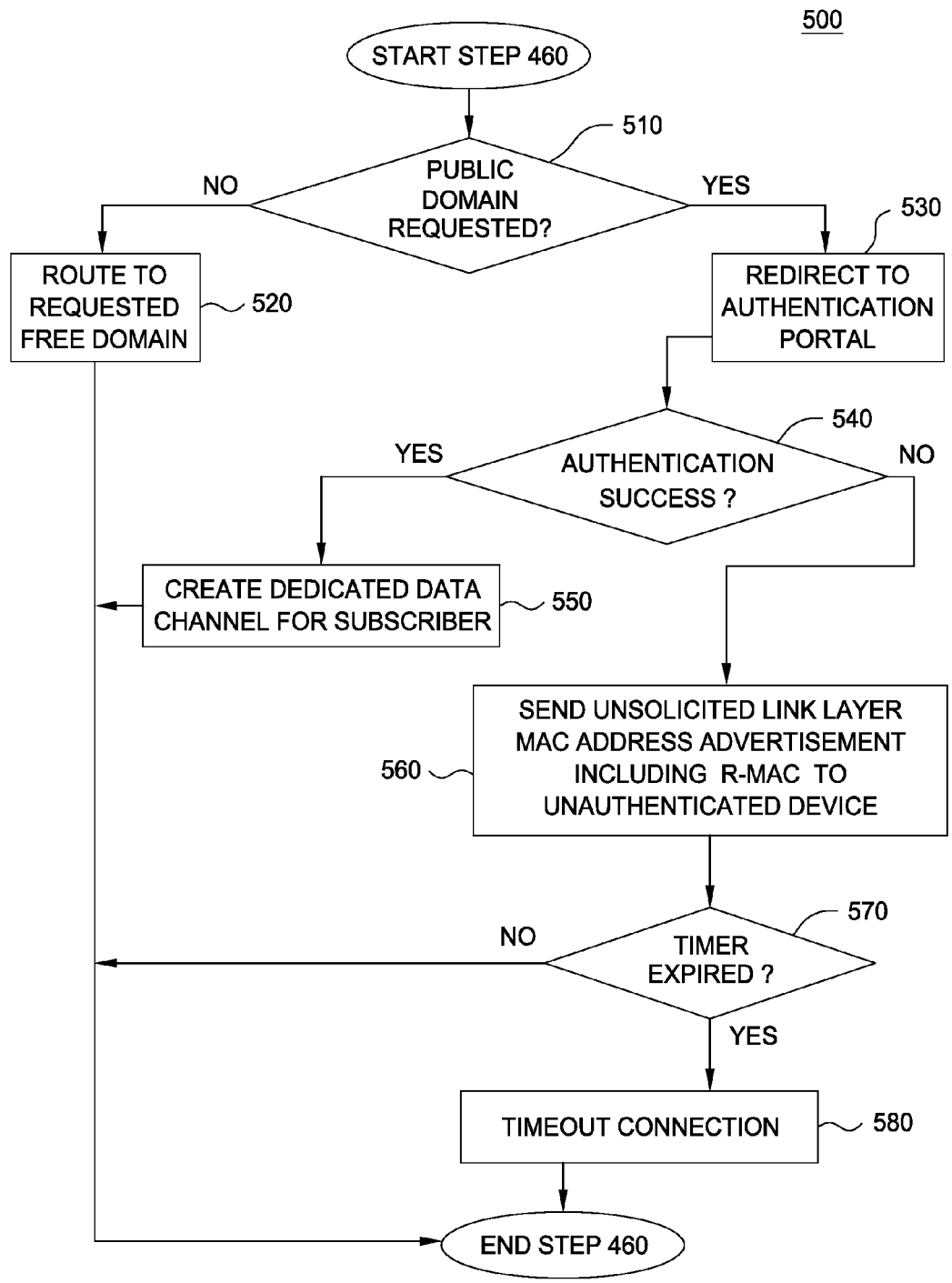
FIG. 5 is a flow chart illustrating a method to process subsequent data packets from unauthenticated devices through a shared data channel for unauthenticated devices, according to one embodiment.

FIG. 5 is a flow chart illustrating a method 500 corresponding to block 460 to process subsequent data packets from unauthenticated devices through a shared data channel for unauthenticated devices, according to one embodiment. Generally, the network device 202, or a designated component thereof, may execute the method 500 in order to manage data flows from unauthenticated devices.

At block 510, the network device 202 determines whether the request sent by the unauthenticated device at block 460 is targeted to a public domain resource that would require subscriber access to reach. If the request is not targeted to a public domain resource (such as a free domain or the authentication portal), at block 520, the network device 202 may route the request to the requested free domain over a shared data channel (the R-MAC data channel). If a public domain resource is requested, at block 530, the network device 202 may redirect the request to the authentication portal. At block 540, the network device 202 may determine whether the user (or device) was successfully authenticated. If the authentication was successful, at block 550, the network device 202 may create a dedicated data channel for the subscriber. If the authentication was not successful, at block 560, the network device 202 may send an unsolicited link layer MAC address advertisement specifying the R-MAC to the unauthenticated device. The MAC address advertisement may be a gratuitous unicast ARP (IPv4) or an unsolicited IPv6 unicast network advertisement (NA). Alternatively, the network device 202 may drop the request at block 560. At block 570, the network device 202 determines whether a timer has expired for the device's allotted time on the R-MAC data channel. If the timer has expired, at block 580, the network device 202 times out the device's connection to the R-MAC data channel. IF the timer has not expired, the method 500 ends. In some embodiments, the timer feature may be an independent, asynchronous event, which need not be associated with the method 500. Generally, when the timer expires, software bindings and forwarding entries for the device may be removed.

Figure 6:
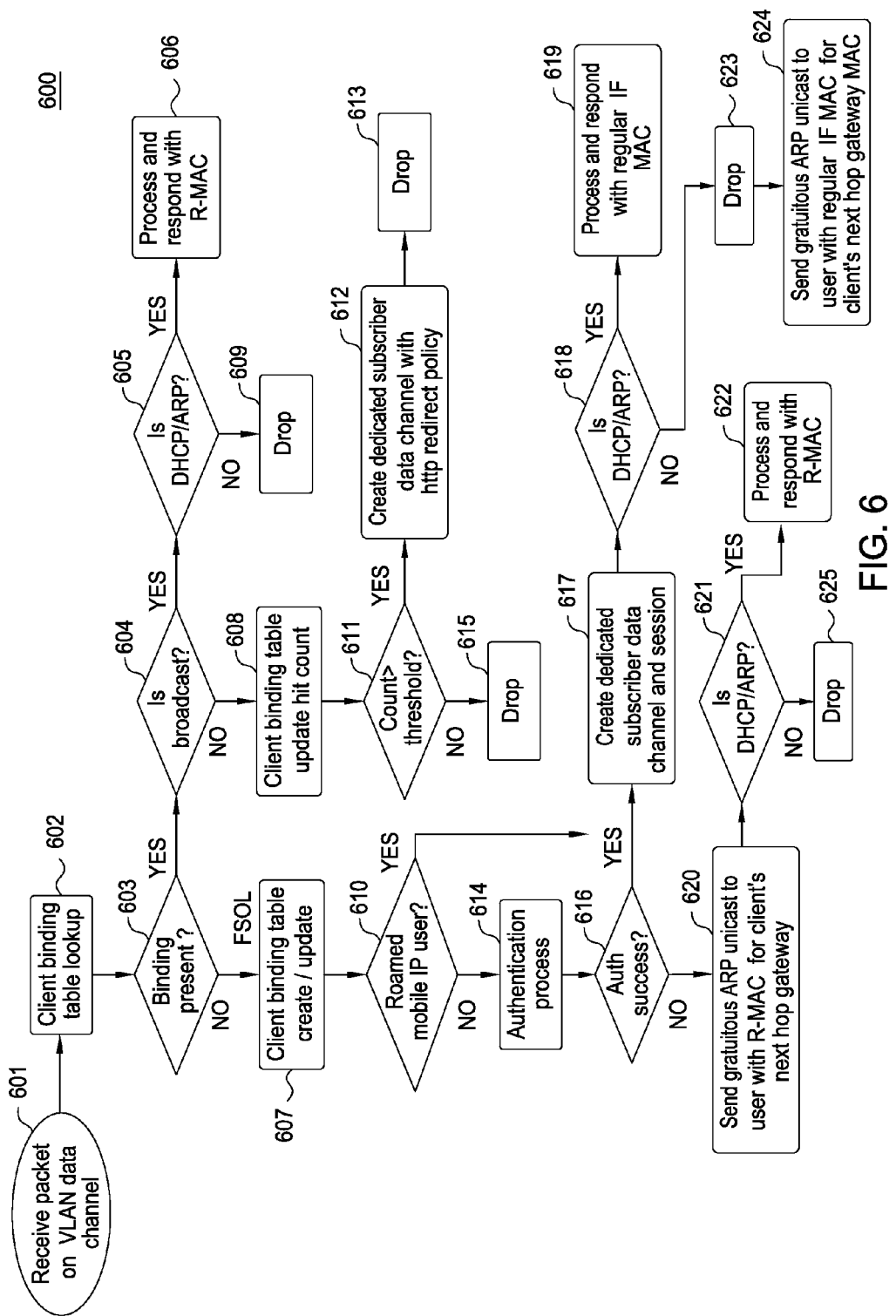
FIG. 6 is a flow chart illustrating a method to classify unauthenticated IP users in a layer-2 broadband aggregation network and optimize session management in a broadband network gateway, according to one embodiment.

FIG. 6 is a flow chart illustrating a method 600 to classify unauthenticated IP users in a layer-2 broadband aggregation network and optimize session management in a broadband network gateway, according to one embodiment. Generally, the network device 202 may implement the method 600 in order to enable unauthenticated flows to be classified into a shared data channel in the data plane of the network device 202. At block 601, the network device 202 may receive a packet on a VLAN data channel. The packet may be a FSOL (ARP, DHCP, NS, RS, or unclassified) packet from a new or roaming user, a broadcast packet from an unauthenticated user, or packets from a device that fails to update its ARP cache or neighbor table responsive to the unsolicited advertisement specifying the R-MAC sent by the network device 202. At block 601, the packet is lifted to the CPU and processed completely in software (at block 607 for FSOL packets and block 604 for control packets).

At block 602, the network device 202 may perform a client binding table lookup. At block 603, the network device 202 determines whether an entry in the binding table for the packet (or the device sending the packet) is present. If a binding entry is present, the network device 202 determines whether the packet is a broadcast packet at block 604. If the packet is a broadcast packet, the network device 202 determines whether the packet is a DHCP or ARP packet at block 605. If the packet is a DHCP or ARP packet, the network device 202 may process the packet and respond with the R-MAC address at block 606. At block 606, the network device 202 may optionally send an unsolicited link layer MAC address advertisement including the R-MAC for the VLAN to the device. The MAC address advertisement may be a gratuitous address resolution protocol (ARP) unicast message or an unsolicited unicast neighbor advertisement (NA). The message may then cause the device to update its ARP cache or neighbor tables to specify the R-MAC as its next hop gateway, allowing the network device 202 to identify subsequent packets from the unauthenticated device. Returning to block 605, if the packet is not a DHCP or an ARP packet, the network device 202 may drop the packet at block 609.

Returning to block 604, if the packet is not a broadcast packet, the network device 202 may update the binding table hit count for the device at block 608. At block 611, the network device 202 determines whether the hit count for the device is greater than a hit count threshold. If the count is not greater than the threshold, the network device 202 may drop the packet at block 615. If the count is greater than the threshold, the network device 202 may create a dedicated subscriber data channel with an HTTP redirect policy at block 612, and drop the packet at block 613.

Returning to block 603, if there is no entry for the device in the binding table, the network device 202 creates an entry in the binding table for the device. The lack of an entry for the device in the binding table may indicate that the network device 202 has not previously received any data packets from the device. As such, the network device 202 may consider such a packet as an FSOL packet. At block 610, the network device 202 determines whether the device belongs to a roaming mobile IP user, namely a user having a mobile data connection (such as a 3G or 4G cellular data connection) that has connected to a Wi-Fi hotspot provided by the mobile data provider. Additionally the device may be roaming if the network device 202 sees the user on a different port, if, for example, the user roams from one wireless access point to a new wireless access point that is connected through another WLC to a different port of the network device 202. If the device belongs to a roaming mobile IP user, the network device 202 proceeds to block 617. If the device does not belong to a roaming mobile IP user, at block 614, the network device 202 may initiate the authentication process with the AAA server. At block 616, the network device 202 determines whether the authentication process was successful. If the authentication process was successful, the network device 202 proceeds to block 617. At block 617, the network device 202 may create a dedicated subscriber data channel and session for the device. At block 618, the network device 202 determines whether the packet is a DHCP or ARP packet. If the packet is a DHCP or ARP packet, at block 619, the network device 202 processes the packet and responds with "regular" interface MAC address for the data channel created at block 617. If the packet is not a DHCP or ARP packet, at block 623 the network device 202 drops the packet. Furthermore, at block 623, the network device 202 may send an unsolicited unicast message (gratuitous ARP or NA) or to the device specifying the "regular" interface MAC address to let the device know its next hop gateway MAC address for the dedicated data channel.

Returning to block 616, if the authentication process is not successful, at block 620, the network device 202 may send an unsolicited unicast message specifying the R-MAC as the device's next hop gateway. The message may be, for example, a gratuitous ARP or NA message. The message may then cause the device to update its ARP cache or neighbor tables to specify the R-MAC as its next hop gateway, allowing the network device 202 to identify subsequent packets from the unauthenticated device. At block 621, the network device 202 determines whether the packet is a DHCP packet or an ARP packet. If the packet is not an ARP or DHCP packet, the network device 202 may drop the packet at block 625. If the packet is a DHCP packet or an ARP packet, the network device 202 may process the packet and respond with the R-MAC at block 622.

Advantageously, embodiments disclosed herein optimize resources in a layer-3 device (such as a router, switch, or broadband network gateway (BNG)) by creating a reserved data channel common for all unauthenticated devices on a VLAN. The reserved data channel may be identified by a special reserved MAC address, also referred to as an R-MAC. Having a common channel pre-created for unauthenticated users may improve the connection set up performance of authenticated subscribers (measured as CPS, calls per second by operators) due to reduced CPU usage for unauthenticated users. If a client device sending a first sign of life (FSOL) packet is not successfully authenticated, embodiments disclosed herein send an unsolicited link layer MAC address advertisement specifying the R-MAC to the unauthenticated device. This may cause the unauthenticated device to update its next hop gateway information, such that all subsequent packets sent by the device specify the R-MAC as a destination MAC address. The networking devices receiving these packets specifying the R-MAC may then place these devices on the reserved data channel. Once on the reserved data channel, the client devices may be limited to accessing the authentication portal, or other authorized "free" locations.

Accordingly, embodiments disclosed herein avoid using system resources for FSOL packets, and provide for small user binding for change-of-authorization after web authentication success. Advantageously, embodiments disclosed herein may manage many unauthenticated users through a single set of data plane classification resources, which allows for unused data plane classification resources to improve sessions for authenticated subscribers.

Embodiments of the disclosure may be provided through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

As will be appreciated by one skilled in the art, embodiments may be embodied as a system, method or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

I claim:

1. A method, comprising:
defining, in a classification table of a routing device, a common data channel shared by unauthenticated devices on a virtual local area network (VLAN), wherein the common data channel is associated with a reserved media access control (MAC) address;
receiving a first sign of life (FSOL) packet from a wireless device, wherein the FSOL packet specifies a MAC address of the wireless device and does not specify the reserved MAC address as a destination MAC address;
initiating an authentication process by sending an access request specifying the MAC address of the wireless device to an authentication server; and
upon determining that the authentication process for the wireless device has failed:
refraining from creating, in the classification table, a dedicated subscriber data channel used only by the wireless device;
sending, by the routing device to the wireless device, an unsolicited link layer advertisement with the reserved MAC address as the link layer address for the common data channel, wherein the unsolicited link layer advertisement causes the wireless device to send packets to the routing device with the reserved MAC address as a destination MAC address; and
responsive to receiving, from the wireless device, a packet specifying the reserved MAC address as the destination MAC address, directing the packet to the common data channel shared by unauthenticated devices based on the association of the common data channel and the reserved MAC address in the classification table.

2. The method of claim 1, wherein the FSOL packet specifies the MAC address of the wireless device as a source address, wherein the MAC address of the wireless device is an unclassified MAC address, wherein the unsolicited link layer advertisement comprises at least one of: (i) a gratuitous address resolution protocol (ARP) message, and (ii) a neighbor advertisement, wherein the common data channel restricts access of the wireless device to: (i) an authentication portal, and (ii) a plurality of free portals.

3. The method of claim 2, further comprising:
upon determining that the wireless device has not been authenticated within a predefined period of time, removing the wireless device from the common data channel.

4. The method of claim 1, wherein the authentication server comprises an authentication, authorization, and accounting (AAA) server, the method further comprising:
upon determining that the authentication process for the wireless device successfully authenticates the wireless device, creating the dedicated subscriber data channel used only by the wireless device.

5. The method of claim 4, wherein a redirect policy of the common data channel redirects a request to access a public domain destination to an authentication portal.

6. The method of claim 1, wherein the wireless device is connected to the routing device through a layer-2 access network, wherein the routing device comprises a broadband network gateway (BNG).

7. The method of claim 1, wherein the FSOL packet comprises at least one of: (i) a dynamic host configuration protocol (DHCP) packet, (ii) an address resolution protocol (ARP) request, (iii) a router solicitation packet, (iv) a neighbor solicitation packet, and (v) a packet from an unclassified MAC address.

8. A routing device, comprising:
a processor; and
a memory containing a program that, when executed by the processor, performs an operation comprising:
defining, in a classification table of the routing device, a common data channel shared by unauthenticated devices on a virtual local area network (VLAN), wherein the common data channel is associated with a reserved media access control (MAC) address;

receiving a first sign of life (FSOL) packet from a wireless device, wherein the FSOL packet specifies a MAC address of the wireless device and does not specify the reserved MAC address as a destination MAC address;

initiating an authentication process by sending an access request specifying the MAC address of the wireless device to an authentication server; and upon determining that the authentication process for the wireless device has failed:

refraining from creating, in the classification table, a dedicated subscriber data channel used only by the wireless device;

sending, by the routing device to the wireless device, an unsolicited link layer advertisement with the reserved MAC address as the link layer address for the common data channel, wherein the unsolicited link layer advertisement causes the wireless device to send packets to the routing device with the reserved MAC address as a destination MAC address; and responsive to receiving, from the wireless device, a packet specifying the reserved MAC address as the destination MAC address, directing the packet to the common data channel shared by unauthenticated devices based on the association of the common data channel and the reserved MAC address in the classification table.

9. The routing device of claim 8, wherein the FSOL packet specifies the MAC address of the wireless device as a source address, wherein the MAC address of the wireless device is an unclassified MAC address, wherein the unsolicited link layer advertisement comprises at least one of: (i) a gratuitous address resolution protocol (ARP) message, and (ii) a neighbor advertisement, wherein the common data channel restricts access of the wireless device to: (i) an authentication portal, and (ii) a plurality of free portals.

10. The routing device of claim 9, the operation further comprising:

upon determining that the wireless device has not been authenticated within a predefined period of time, removing the device from the common data channel.

11. The routing device of claim 8, wherein the authentication server comprises an authentication, authorization, and accounting (AAA) server, the operation further comprising:

upon determining that the authentication process for the wireless device successfully authenticates the wireless device, creating the dedicated subscriber data channel used only by the wireless device.

12. The routing device of claim 11, wherein a redirect policy of the common data channel redirects a request to access a public domain destination to an authentication portal.

13. The routing device of claim 8, wherein the wireless device is connected to the routing device through a layer-2 access network, wherein the routing device comprises a broadband network gateway (BNG).

14. The routing device of claim 8, wherein the FSOL packet comprises at least one of: (i) a dynamic host configuration protocol (DHCP) packet, (ii) an address resolution protocol (ARP) request, (iii) a router solicitation packet, (iv) a neighbor solicitation packet, and (v) a packet from an unclassified MAC address.

15. A computer program product, comprising:

a non-transitory computer-readable medium storing computer code that, when executed by a processor, performs an operation comprising:

defining, in a classification table of a routing device, a common data channel shared by unauthenticated devices on a virtual local area network (VLAN), wherein the common data channel is associated with a reserved media access control (MAC) address;

receiving a first sign of life (FSOL) packet from a wireless device, wherein the FSOL packet specifies a MAC address of the wireless device and does not specify the reserved MAC address as a destination MAC address;

initiating an authentication process by sending an access request specifying the MAC address of the wireless device to an authentication server; and upon determining that the authentication process for the wireless device has failed:

refraining from creating, in the classification table, a dedicated subscriber data channel used only by the wireless device;

sending, by the routing device to the wireless device, an unsolicited link layer advertisement with the reserved MAC address as the link layer address for the common data channel, wherein the unsolicited link layer advertisement causes the wireless device to send packets to the routing device with the reserved MAC address as a destination MAC address; and responsive to receiving, from the wireless device, a packet specifying the reserved MAC address as the destination MAC address, directing the packet to the common data channel shared by unauthenticated devices based on the association of the common data channel and the reserved MAC address in the classification table.

16. The computer program product of claim 15, wherein the FSOL packet specifies the MAC address of the wireless device as a source address, wherein the MAC address of the wireless device is an unclassified MAC address, wherein the unsolicited link layer advertisement comprises at least one of: (i) a gratuitous address resolution protocol (ARP) message, and (ii) a neighbor advertisement, wherein the common data channel restricts access of the wireless device to: (i) an authentication portal, and (ii) a plurality of free portals.

17. The computer program product of claim 16, the operation further comprising:

upon determining that the wireless device has not been authenticated within a predefined period of time, removing the device from the common data channel.

18. The computer program product of claim 17, wherein the classification table comprises a plurality of entries including a first entry for the common data channel, wherein each entry in the classification table comprises: (i) a source MAC address, (ii) a VLAN identifier, and (iii) a micro interface descriptor block of a respective data flow of a plurality of data flows, wherein the wireless device is connected to the routing device through a layer-2 access network, wherein the routing device comprises a broadband network gateway (BNG).

19. The computer program product of claim 18, wherein the authentication server comprises an authentication, authorization, and accounting (AAA) server, the operation further comprising:

upon determining that the authentication process for the wireless device successfully authenticates the wireless device, creating the dedicated subscriber data channel used for the wireless device in the classification table.

20. The computer program product of claim 19, wherein a redirect policy of the common data channel redirects a request to access a public domain destination to an authentication portal.

\* \* \* \* \*